United States Patent [19]

Delfino et al.

[11] 4,380,480
[45] Apr. 19, 1983

[54] METHOD OF MAKING ONE-PIECE TUBULAR AXLE BLANKS AND THE PRODUCED AXLE BLANKS

[75] Inventors: Jean-Jacques Delfino, Montmorency; Maurice Prevot, Avesnes S/Elpe, both of France

[73] Assignee: Vallourec, Paris, France

[21] Appl. No.: 332,375

[22] Filed: Dec. 21, 1981

[30] Foreign Application Priority Data

Jan. 20, 1981 [FR] France .................................. 81 00976

[51] Int. Cl.³ .............................................. C21D 9/08
[52] U.S. Cl. ...................................... 148/12.4; 148/39
[58] Field of Search ...................... 148/12.4, 12 R, 31, 148/39

[56] References Cited

U.S. PATENT DOCUMENTS

| | | | |
|---|---|---|---|
| 1,967,317 | 7/1934 | Mogford et al. | 148/12.4 |
| 2,632,235 | 3/1953 | Doyle et al. | 148/12 R |
| 3,492,116 | 1/1970 | Kenneford et al. | 148/12.4 |
| 3,535,910 | 10/1970 | Connolly | 148/12.4 |
| 3,966,507 | 6/1976 | Herbert | 148/12.4 |
| 4,204,892 | 5/1980 | Economopoulos | 148/12.4 |

*Primary Examiner*—W. Stallard
*Attorney, Agent, or Firm*—McDougall, Hersh, & Scott

[57] ABSTRACT

A method for the economical manufacture of one-piece tubular axle blanks of the type having a center portion with journals at both ends. The method involves quenching a length of a preheated steel tube followed by tempering and then swaging at both ends by forging or hammering. The areas of transition between the center portion and the respective journals are thickened by upsetting, and the ends of the axle blank are subsequently locally heat treated by annealing.

12 Claims, 2 Drawing Figures

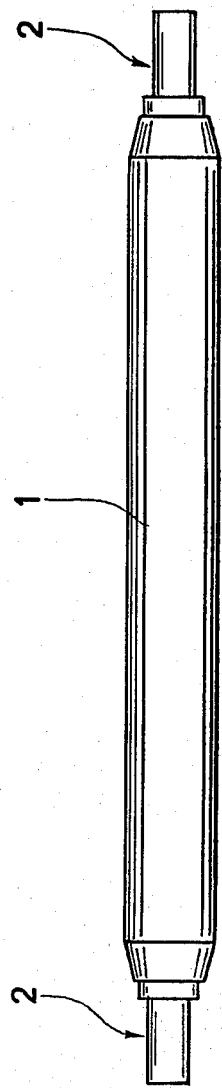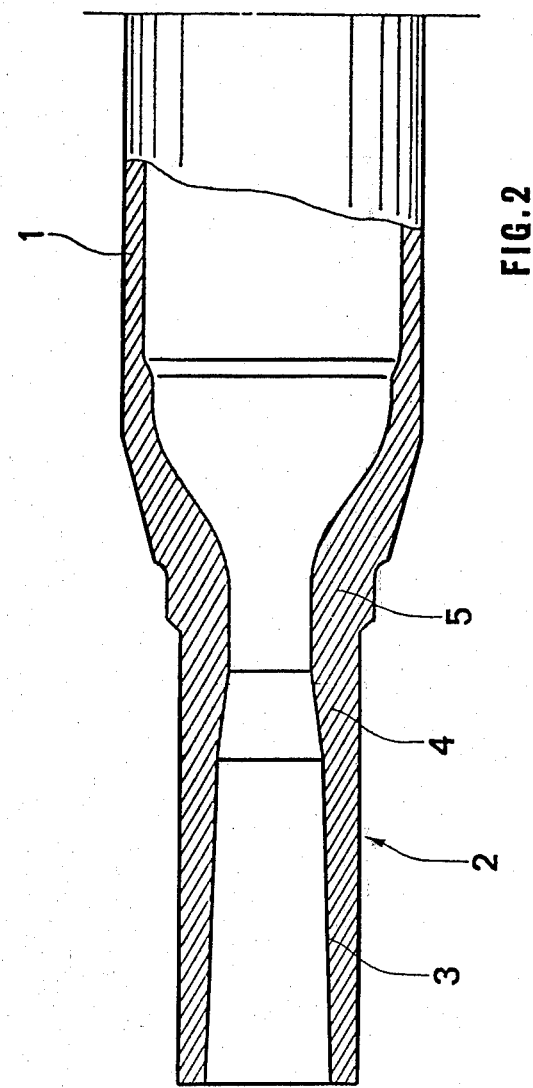

METHOD OF MAKING ONE-PIECE TUBULAR AXLE BLANKS AND THE PRODUCED AXLE BLANKS

This invention relates to a method of making one-piece tubular axle blanks, composed of a center portion having journals at both ends, intended for rolling vehicles either for roads or not, among others tractor-drawn commercial vehicles, such as trailers or semi-trailers.

There are essentially two families of processes for making hollow tubular axle blanks.

A first family of processes provides for the manufacture of composite axle blanks, that is to say made of several assembled parts. One known manner is to make such axle blanks by longitudinally assembling two halves each consisting of a starting product, especially a sheet or strip, formed by deep drawing or forging, for example, to an U-shape of variable section, the journals being executed beforehand on the starting product. Another known practice is to make tubular axle blanks by fitting to a tubular center portion the separately made journals by any suitable method, particularly by welding.

The second family of axle blank manufacturing processes provides for the obtention of one-piece axle blanks. Generally the starting product is a plain pipe of uniform wall thickness and suitable section, for example, round, oval, rectangular, or square, the ends of which are reduced by forging or hammering so as to obtain the cross-sectional reduction corresponding to the journals, the hot forming operations ending with a final heat treatment of the blank as a whole. The heat treatment to which the axle blank is subjected depends on the properties of the steel used. According to the latter the axle blank is either subjected to quenching and tempering or to a normalizing treatment. The heat treatment has the inconvenient to create in the axle blank which is a product of variable section deformations requiring subsequent straightening which is a source of residual stresses in the finished blank.

The axles obtained from the axle blanks known heretofore have the drawback not to have in any point of their length dimensional and mechanical properties consistent with the stress they undergo in use. In order to provide for a sufficient long axle life the manufacturers are thus induced to oversize the axles or certain particular portions of them, thus increasing the axle weight and manufacturing cost.

The present invention proposes to provide a method for the economical manufacture of one-piece tubular axle blanks permitting to obtain axles having particularly mechanical properties in their various portions which are adequate for the stresses they are subjected to in use while having, for a given diameter and the same operating features, a center portion with a lighter wall as compared to the conventional axles.

In the method to the invention the whole length of a preheated steel tube is subjected to quenching, particularly water quenching, followed by tempering and is then swaged at both ends by forging or hammering while the area of transition between the center portion and the journal is, moreover, thickened by upsetting, both ends of the axle blank being subsequently locally heat treated by annealing.

In a first form of the invention quenching is performed on tubes of great length such as disclosed, for example, in the French patent application No. 79 08 911 of the applicant. After that the tubes are tempered in great length and, after having been subjected to sizing and straightening, they are cut to the length corresponding to the anticipated axle blank length.

In a second form of the invention quenching and tempering are performed with tubes precut to the anticipated axle blank length.

According to the invention forging and upsetting and annealing can be performed in the same manufacturing line after quenching and tempering. Alternately it may be anticipated to perform the quench and temper treatment separately and to subject the quenched and tempered tubes to the following steps of the method to the invention later on, after a possible storage.

The steel used under the invention is a structural steel type which can be hardened, particularly in water, and is weldable.

The swaging and upsetting operations by which are formed the journals and the areas of transition between the latter and the center portion are preferably carried out in one single operation by heating the corresponding end section of the tube that has been quenched and tempered and cut beforehand such as set forth above, rapidly and scale-free, for example by induction, and by hammering it over an internal mandrel of appropriate shape in a machine enabling an insertion with axial rotation of the tube while an axial thrust is being exerted endwise upon the tube.

Under the invention it is of course possible to perform swaging and upsetting in two successive operations, whereby upsetting is achieved by the axial thrust of the tube, especially on a mandrel, after heating of the corresponding tube portion, swaging by forging or hammering being performed afterwards after having achieved the desired thickening of the transition area between the center portion and the journal by upsetting.

The annealing operation after shaping can advantageously be carried out by successively heating the ends for rather short periods of time in an induction furnace with rapid temperature rise and homogenizing them in the same or in another furnace, particularly an electric resistance furnace.

In the method according to the invention the heat treatment is thus confined to the localized treatment of both ends of the axle blanks, that is to say localized to both journals and both areas of transition, without disturbing the metallurgical structure of the center portion of the axle. Thus the method preserves the mechanical properties initially imparted to the center portion of the blank by the heat treatment carried out on the blank in tubular shape prior to forging of the journals.

The method avoids to have to perform a final metallurgical treatment of the blank as a whole. Thus it prevents local deformations and the necessity of performing a final straightening of the whole blank after forging of the journals as in the former art. Final straightening is usually a source of very detrimental local residual stresses.

The axle blank obtained by the method according to the invention embodies a metallurgical structure in the center portion different from that in the journals with a continuous transition of this metallurgical structure between the center portion and each of the journals.

By the method according to the invention is it possible to make, for a given diameter, axle blanks the center portion of which has a lighter wall than the wall thicknesses likely to be used for comparable operating features for normalized axle blanks made to the conventional methods. This reduction in wall thickness and thereby in weight of the axle amounts to about 13% as compared to the conventional axles of normalized steel with comparable utilization properties or service life.

The thickness of the axle blank obtained by the method to the invention has its maximum value in the tapered transition area between the center portion and each of the journals and its minimum value in the center portion, the walls of the journals being always heavier than those of the center portion. The thickening in the junction area between the center portion and the journal is greater than that which would be produced by a continuous variation resulting from simple metal swaging by forging or hammering.

For obtaining an axle the blank produced by the method to the invention is then machined to form in the journals the areas receiving the bearings, and it is fitted with the accessories necessary for its utilization.

With the aim to permit a better understanding of the invention an in no way limiting description of a method of execution will be given hereinafter by way of example, reference being made to the attached drawing wherein:

FIG. 1 represents an axle blank obtained by the method of the invention,

FIG. 2 is an enlarged section of one end of the blank of FIG. 1.

FIGS. 1 and 2 show an axle composed of a center portion 1 and a journal 2 at each end.

The journals 2 have a cylindrical or slightly tapered inner wall surface 3.

Between the journals and the center portion there is a transition area in which the inner wall of the axle has a surface shaped like a truncated cone (3), the wall growing increasingly heavier until it reaches its maximum value in the thickened area between 4 and 5 and decreasing then until it reaches its minimum value in the center portion. The wall thickness of the center portion 1 is always inferior to the wall thickness of the journals 2.

Thus an axle blank has been made according to the invention of a steel corresponding to the AFNOR designation 20MV6, having a standard diameter of 152.4 mm and a wall thickness in the center portion of 10 mm whereas the minimum wall thicknesses likely to be obtained by conventional methods for the same diameter and normalized steels are of 12 mm. For an obtained axle blank length of 2100 mm the weight is of 82.5 kg, whereas the weight of a conventional axle blank of the same diameter and of comparable utilization properties is of 95 kg.

For making this axle a tube has been water quenched such as disclosed in the French Pat. No. 79 08 911. After tempering it has been sized and straightened.

Then it has been cut to lengths of 2300 mm.

For execution of the journals and of the transition area between the journals and the center portion both ends of the cut tubes have been successively heated to about 1200° C. on a length of approx. 450 mm. Then each end has been hammered over an internal mandrel by inserting the tube with axial rotation into a hammering machine exerting an axial thrust on the tube end.

The maximum metal thickness in the transition area, obtained by upsetting, is of 24.5 mm the thickness at the outer end of the journals being of 15 mm.

Then each journal, starting from the transition area up to its end, has been annealed in an induction furnace at 950° C. followed by a passage in an equalizing furnace, for example an electrical resistance furnace, the utilization range of which is comprised between 900° and 1000° C. This final heat treatment has the advantage not to create any deformation which would require a subsequent straightening generating residual stresses.

The produced axle is featured by a yield strength of 588 N/mm$^2$ or more in the center portion and of 441 N/mm$^2$ or more in the journals.

It is also featured by a resilience at 0° C. of 6.5 daJ/cm$^2$ or more in the center portion and of 5.5 daJ/cm$^2$ or more in the journals. The average elongation in the transition area is equal of superior to 20%.

Although the invention has been described in connection with a particular form of execution it is obvious that it is in no way restricted to it and that a great number of alternates and modifications may be made without departing neither from its scope nor from its spirit.

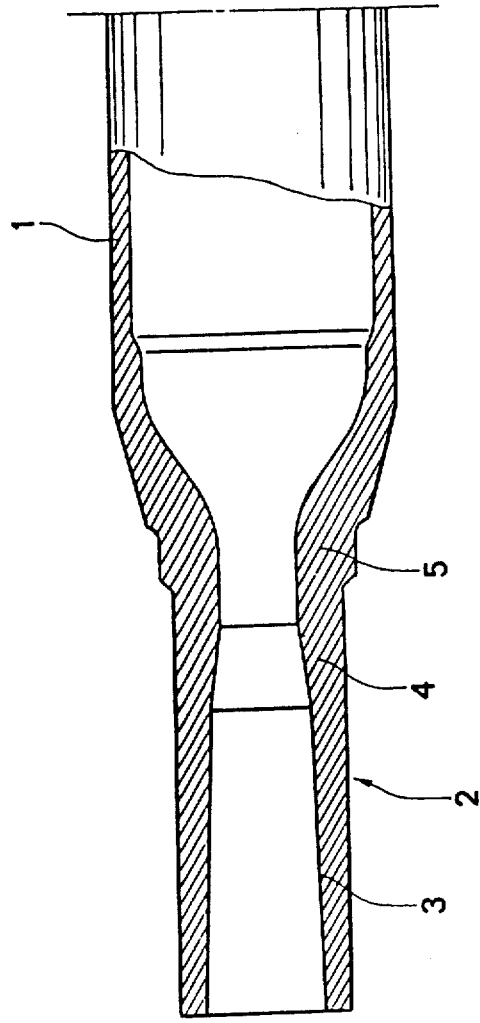

We claim:

1. Method of making one-piece tubular wheel axle blanks composed of a center portion having journals at both ends, wherein a preheated steel tube is subjected to quenching particularly in water over its whole length followed by tempering, the tube ends being then swaged while the transition area between the center portion and the journal is, moreover, thickened by upsetting, whereupon both ends of the axle blank are locally heat treated by annealing.

2. Method according to claim 1, wherein quenching is performed with tubes in great length and wherein the tube in great length, after having been tempered, sized and straightened, is cut to the length corresponding to the anticipated axle blank length.

3. Method according to claim 1, wherein quenching is performed with tubes pre-cut to the anticipated axle blank length.

4. Method according to one of the preceding claims, wherein swaging and upsetting are performed in a single operation by heating the corresponding end portion of the tube that has been quenched and tempered and cut beforehand, rapidly and scale-free particularly by induction, and forging it over an internal mandrel while exerting an axial thrust upon the end of the inserted tube which is rotated axially.

5. Method according to one of the claims 1 to 3, wherein swaging and upsetting are performed in two successive operations.

6. Method according to one of the preceding claims, wherein the annealing operation is at least partially performed by induction.

7. Method according to claim 6, wherein the annealing operation embodies a rapid heating phase, particularly in an induction furnace, and a homogenizing phase.

8. Method according to one of the preceding claims, wherein the starting tube is made of a weldable structural steel hardenable particularly in water.

9. Method according to claim 8, wherein the starting tube is made of the steel grade 20MV6 according to AFNOR designation.

10. One-piece tubular wheel axle blank produced by the method according to one of the preceding claims.

11. Axle blank according to claim 10 embodying a metallurgical structure in the center portion different from that in the journals with a continuous transition of the metallurgical struction between the center portion and each of the journals.

12. Axle blank according to claim 10 or 11 having a maximum wall thickness in the junction area between the center portion and each of the journals and a minimum wall thickness in the center portion, such wall thickness decreasing from the junction area to the outer end of each journal, the thickness of the journal being superior to the thickness of the center portion.

* * * * *

UNITED STATES PATENT AND TRADEMARK OFFICE
CERTIFICATE OF CORRECTION

PATENT NO. : 4,380,480

DATED : April 19, 1983

INVENTOR(S) : Jean-Jacques Delfino, et al

It is certified that error appears in the above-identified patent and that said Letters Patent is hereby corrected as shown below:

The title page should be deleted to appear as per attached title page.

Signed and Sealed this

Eighth Day of May 1984

[SEAL]

Attest:

Attesting Officer

GERALD J. MOSSINGHOFF

Commissioner of Patents and Trademarks

United States Patent [19]

Delfino et al.

[11] 4,380,480
[45] Apr. 19, 1983

[54] METHOD OF MAKING ONE-PIECE TUBULAR AXLE BLANKS AND THE PRODUCED AXLE BLANKS

[75] Inventors: Jean-Jacques Delfino, Montmorency; Maurice Prevot, Avesnes S/Elpe, both of France

[73] Assignee: Vallourec, Paris, France

[21] Appl. No.: 332,375

[22] Filed: Dec. 21, 1981

[30] Foreign Application Priority Data

Jan. 20, 1981 [FR] France ............... 81 00976

[51] Int. Cl.³ .............................. C21D 9/08
[52] U.S. Cl. ............................ 148/12.4; 148/39
[58] Field of Search ............ 148/12.4, 12 R, 31, 148/39

[56] References Cited

U.S. PATENT DOCUMENTS

| | | | |
|---|---|---|---|
| 1,967,317 | 7/1934 | Mogford et al. | 148/12.4 |
| 2,632,235 | 3/1953 | Doyle et al. | 148/12 R |
| 3,492,116 | 1/1970 | Kenneford et al. | 148/12.4 |
| 3,535,910 | 10/1970 | Connolly | 148/12.4 |
| 3,966,507 | 6/1976 | Herbert | 148/12.4 |
| 4,204,892 | 5/1980 | Economopoulos | 148/12.4 |

Primary Examiner—W. Stallard
Attorney, Agent, or Firm—McDougall, Hersh, & Scott

[57] ABSTRACT

A method for the economical manufacture of one-piece tubular axle blanks of the type having a center portion with journals at both ends. The method involves quenching a length of a preheated steel tube followed by tempering and then swaging at both ends by forging or hammering. The areas of transition between the center portion and the respective journals are thickened by upsetting, and the ends of the axle blank are subsequently locally heat treated by annealing.

12 Claims, 2 Drawing Figures